Oct. 29, 1929.  W. F. BARRY  1,733,215
FILM MOUNT
Filed Dec. 2, 1927  2 Sheets-Sheet 1
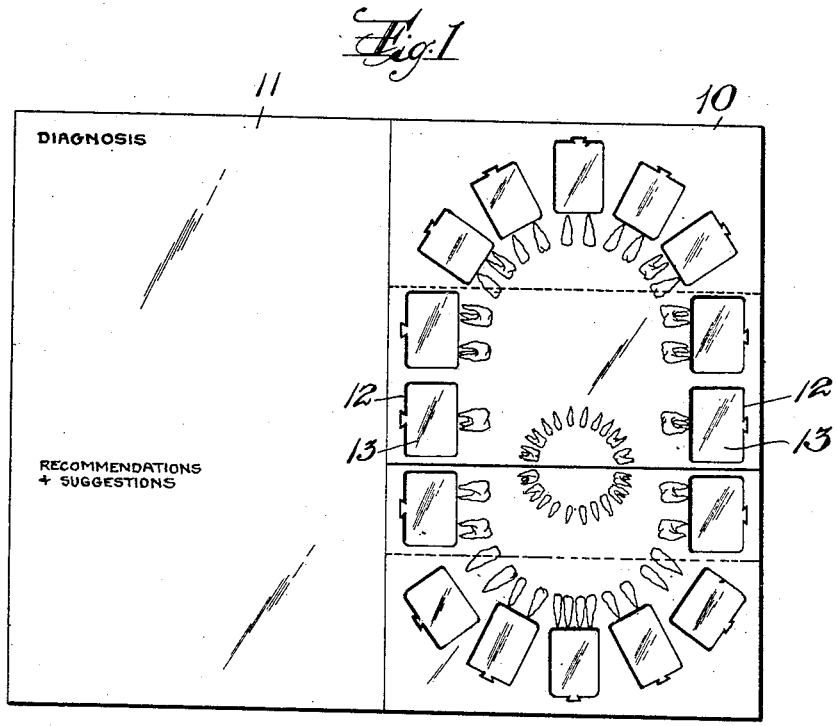
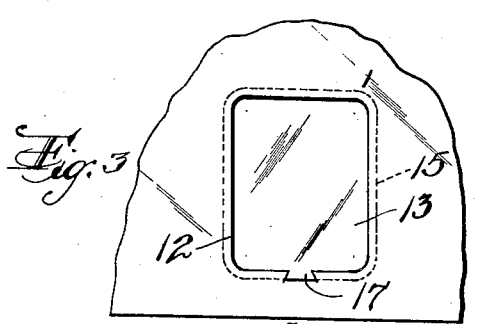
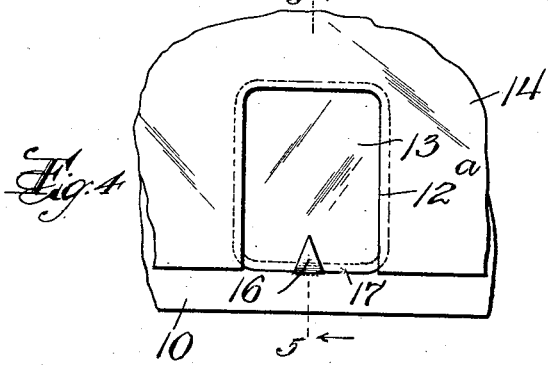
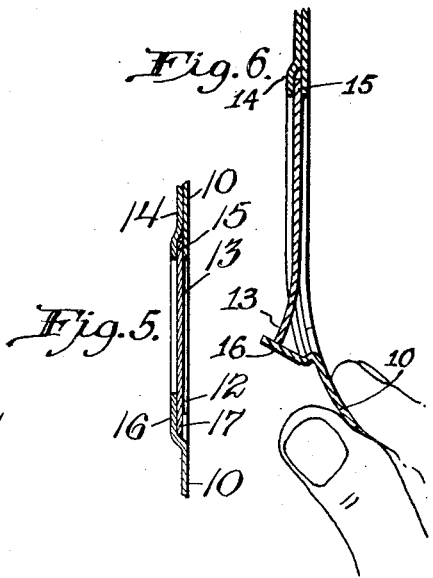
INVENTOR
Walter F. Barry,
BY
Wm H. Caufield,
ATTORNEY.

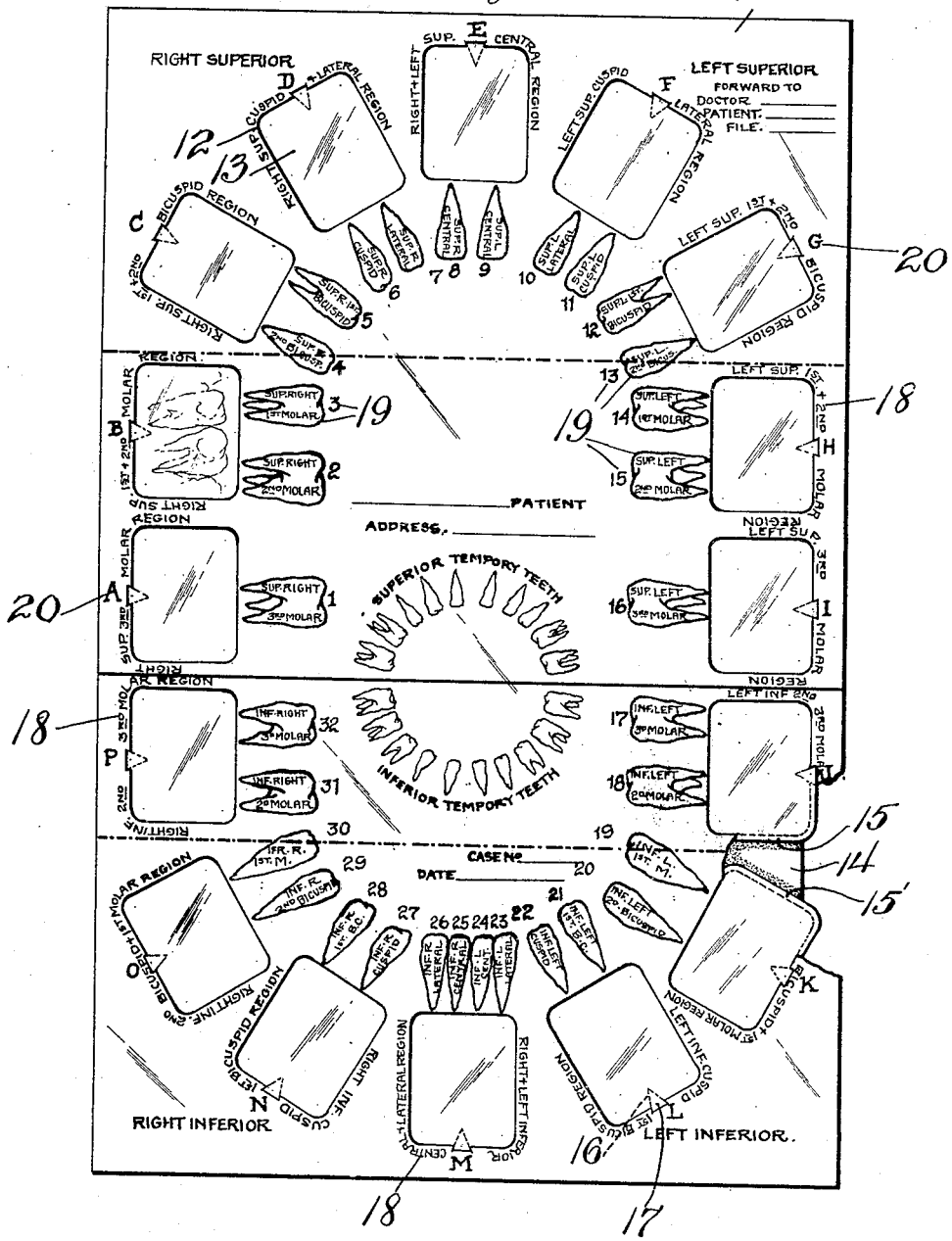

Patented Oct. 29, 1929

1,733,215

UNITED STATES PATENT OFFICE

WALTER F. BARRY, OF NEWARK, NEW JERSEY

FILM MOUNT

Application filed December 2, 1927. Serial No. 237,238.

This invention relates to an improved mount for films and is particularly adapted for the use of dental or medical films used in X-ray diagnosis and the mount not only firmly holds the films but is preferably designed to facilitate the study and location of defects and ills that are disclosed by the pictures. The drawings and description are directed to a preferred form of holder or mount for dental films. This mount not only holds the films of adjacent mouth regions in proper relative positions but also contains indicia and supplemental information on which the trouble can be plainly marked by the party making the diagnosis.

The invention resides in the assembling of two sheets of material, usually cardboard, with openings in them, the sheets being pasted or otherwise secured together at a slight distance from the openings, except on one edge of each opening which forms a slit for inserting a film between the sheets, the film being thus held at its edges by the rims of the openings, the rims of which are left free far enough to provide a grip on the edges of the film. On the open end of the opening I place, on one of the sheets, a tab which is normally flat when the mount is supplied to the dentist and which is disposed so that it is snapped over the edge of the film and when the sheets have resumed their flat position the film is held firmly in position.

While I have illustrated this invention as constructed to receive a set of films it will be evident that a single pocket can be made according to the invention.

The invention is illustrated in the accompanying drawings, in which Figure 1 is a view of a mount with a cover on which information can be noted. Figure 2 is an enlarged view of the mount without the cover and with a more detached showing of the usual make up. Figure 3 is a front view on an enlarged scale of the mount of one film and Figure 4 is a back view thereof. Figure 5 is a section on line 5—5 in Figure 4. Figure 6 is a section showing how the tab is snapped over the edge of a film.

In cases where a written report is to be submitted with the film the device comprises a sheet 10 which holds the film or films and a cover 11 on which can be noted the diagnosis and also recommendations and suggestions for treatment. This cover, however, can be dispensed with if desired.

The sheet 10 has openings 12 into which the films 13 are placed and when held to the light the films can be studied for detection of defects in the case of X-ray pictures. The sheet 10 has a sheet 14 on the back of it and these sheets, 10 and 14 are pasted together or otherwise secured so as to leave a clear space around the edge or rim of the openings 12. This allows the film 13 to be slid into place with its edges 15 within the space between the sheets.

One of the sheets, as 10, has a tab 16 which extends from the edge of the opening 12 and is cut in far enough to allow the edge 17 of the film to extend part way into the space between the sheets. The parts are thin and flexible. After the film is slid into place the assembled parts are flexed between the thumb and finger as shown in Figure 6 to cause the tab to be snapped under the edge of the film and it then locks the film in position. This will be evident from Figures 4 and 5. The thickness of the sheets is very much exaggerated in the drawing and in actual use the parts are substantially flat after they are assembled.

The mount can be made to include films showing parts of or the whole mouth and to include identification data for parts and defects.

In the form shown the openings are marked at the edges with indicia showing the superior or inferior right or left regions and the teeth that are situated therein. A form of such indicia is indicated at 18 in the drawings.

The teeth in each of these regions can be outlined adjacent their positions and in proper sequence and they can be numbered. Such data is shown at 19 in the drawings.

These representations of teeth are also useful in that they can be marked to show the parts affected to amplify the showing that would be otherwise inconspicuous to one not familiar with the study of X-ray pictures.

Each of the films can be further identified by such marks as the letters at 20 to make more convenient the notations on sheet 10 relative to the parts to be referred to in a diagnosis.

The under sheet 14 is, of course, provided with an opening in register with the openings 12 in the sheet 10 and the mount, when held to a light, clearly shows the relative arrangement of parts of the mouth and permits of an easy and prompt diagnosis of conditions therein.

In the case of temporary or children's teeth I provide a supplemental chart which can be used for marking the particular teeth displayed in films mounted in the openings.

Another advantage of this construction is that there is no celluloid or other material in front of or in back of the film and thus there is no interference with a clear inspection of the picture and the details of the film are plain and a diagnosis is thus facilitated.

With this device the diagnosis is readily understandable by persons inspecting it even although they are not familiar with the study of X-ray photographs.

I claim:—

1. A film mount comprising a flexible sheet with an opening therein, a second flexible sheet superimposed and secured on the first sheet and with an opening in register with the first sheet, the sheets being free of attachment at one edge to allow an entrance slit for a film, and a tab struck up from one sheet and disposed to be snapped over the edge of the film at the slit when the sheets are flexed and form a stop when the sheets are flattened.

2. A film mount comprising two flexible sheets pasted together and having aligned openings, the edges of the openings being free from paste, one side being open to form a slit, one of the sheets having a tab normally flat and adapted to be snapped over the edge of a film between the sheets when the two sheets are flexed and form a stop when the sheets are flattened.

3. A film mount comprising two sheets of cardboard with aligned openings and secured together except at one edge, one sheet being longer than the other at said edge, the opening in the shorter sheet extending to the edge, the longer sheet having a tab disposed so as to be snapped over the edge of a film between the sheets when the sheets are flexed so as to form a stop when the sheets are again flat.

4. A film mount comprising a sheet of cardboard, a second sheet of cardboard inset at the edges from the first sheet, and having openings extending to its edge, the second sheet having openings aligned with the openings of the first sheet, the sheets being secured together at three sides of said openings and leaving the fourth side as an entrance slit for inserting films edgewise, and tabs on the first sheet and integral therewith and disposed so as to be snapped over the films between the sheets when the sheets and the films are flexed whereby stops for the film pockets are provided.

5. A film mount comprising two flexible sheets, each sheet having an opening therein, the opening in one sheet being aligned with the opening in the other sheet, the sheets being secured together to leave the edges of the openings free for sliding a film therein, one side of the edge of one sheet being provided with a tab extending for a slight distance beyond the edge and into the opening and adapted to be bent over the edge of the film to hold it in place.

In testimony whereof I affix my signature.

WALTER F. BARRY.